United States Patent [19]

Majima

[11] Patent Number: 5,097,461
[45] Date of Patent: Mar. 17, 1992

[54] SYNCHRONIZING CIRCUITRY FOR THE PLAYBACK AND RECORDING UNITS OF A DUBBING APPARATUS

[75] Inventor: Shinichi Majima, Yokohama, Japan
[73] Assignee: Kabushiki Kaisha Toshiba, Kanagawa, Japan
[21] Appl. No.: 289,523
[22] Filed: Dec. 27, 1988

Related U.S. Application Data

[63] Continuation of Ser. No. 903,247, Sep. 3, 1986, abandoned.

[30] Foreign Application Priority Data

Sep. 3, 1985 [JP] Japan .................. 60-194105

[51] Int. Cl.⁵ .................. G11B 3/64; G11B 7/28; G11B 5/86
[52] U.S. Cl. .................. 369/84; 369/85; 369/14; 360/15
[58] Field of Search .......... 369/60, 84, 85, 29, 369/33; 360/60, 73, 13-15, 92, 93, 69

[56] References Cited

U.S. PATENT DOCUMENTS

| | | | |
|---|---|---|---|
| 3,014,991 | 12/1961 | Logan | 369/29 |
| 3,560,666 | 2/1971 | Bookman | 360/92 |
| 4,139,875 | 2/1979 | Tatara et al. | 360/94 |
| 4,167,026 | 9/1979 | Sambe et al. | 360/15 |
| 4,471,390 | 9/1989 | Hamann | 360/73 |
| 4,543,618 | 9/1985 | Sato | 360/15 |

FOREIGN PATENT DOCUMENTS 58-130455 8/1983 Japan .

Primary Examiner—Stuart S. Levy
Assistant Examiner—Joseph A. Rhoa
Attorney, Agent, or Firm—Finnegan, Henderson, Farabow, Garrett and Dunner

[57] ABSTRACT

A synchronizing circuit for a dubbing apparatus which is capable of a dubbing a signal played back from a playback unit to a recording unit in accordance with the operation of a dubbing command key. The synchronizing circuit essentially includes a circuit for checking the recording unit to determine if the recording unit has been brought into a stable recording condition and for producing a synchronous recording request signal, a device for driving the playback unit in response to the synchronous recording request signal, a circuit for checking the playback unit to determine if the playback unit is ready to playback and for producing a synchronous recording start signal, and a device for driving the recording unit into a recording mode in response to the synchronous recording start signal.

6 Claims, 2 Drawing Sheets

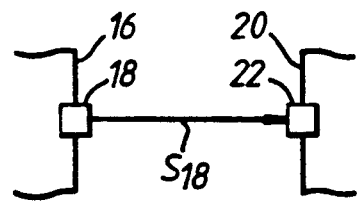
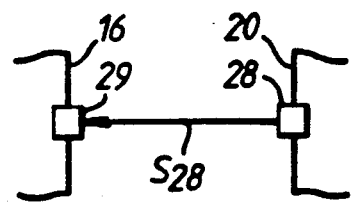
Fig.3(a). Fig.4(a).
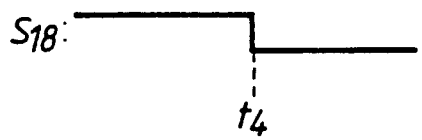
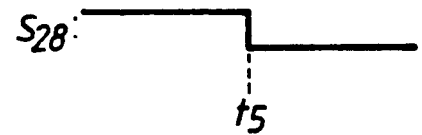
Fig.3(b). Fig.4(b).
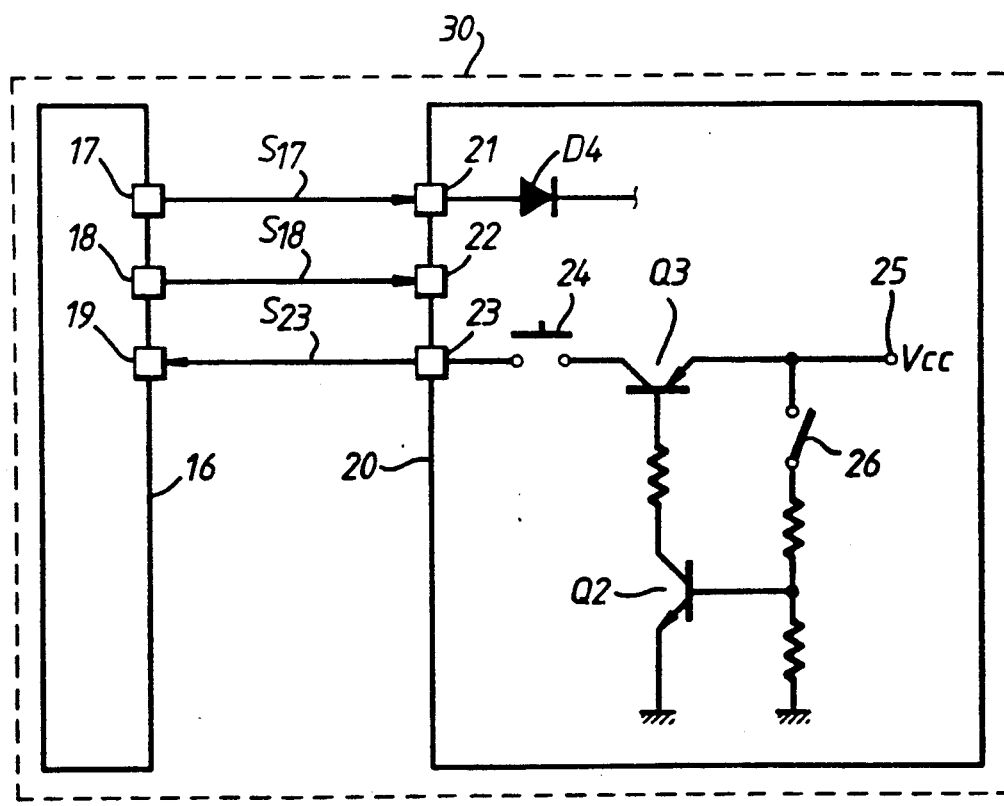
Fig. 5.

SYNCHRONIZING CIRCUITRY FOR THE PLAYBACK AND RECORDING UNITS OF A DUBBING APPARATUS

This application is a continuation of application Ser. No. 06/903,247, filed Sept. 3, 1986 now abandoned.

BACKGROUND OF THE INVENTION

1. Field of the Invention

The present invention relates generally to a dubbing apparatus, and more particularly to a synchronizing circuit for a playback unit and a recording unit in a dubbing apparatus.

2. Description of the Prior Art

As well known, cassette tapes have merits of being compact in size and easy to handle compared to conventional so-called open tapes. Due to the compactness and the handiness of the cassette tapes, cassette tape recorders have been popular for a long time in the audio field, and a variety of functions have been recently developed for such equipment. For example, double cassette tape recorders, i.e., combination apparatus of two cassette tape drive mechanisms in a single body (hereafter referred as double cassette tape recorders) are widely used in the portable equipment field. The double cassette tape recorders are convenient for dubbing from a recorded tape on one tape drive mechanism in the playback mode to an unrecorded tape on the other tape drive mechanism in the recording mode.

In addition, CD (Compact Disc) players have recently become popular in the same field. The CD is a digital record disc which carries recorded audio signals in the form of digital data signals which may be optically read therefrom. Similar to the cassette tapes, the CDs also have the merits of being compact in size and easy to handle compared to conventional analog records. As is well known, the CDs have the further merit of a very high fidelity compared to analog record mediums.

Therefore, combination apparatus of the CD player and the cassette tape recorder in a single body (hereafter referred as CD-cassette players) also have been recently developing. The CD-cassette players are convenient for easy playback of cassette tapes and CDs and may be used for dubbing of the CDs to the cassette tapes.

The combination apparatus such as the double cassette tape recorders or the CD-cassette players are now capable of performing the dubbing with a one-touch action of an operator. An example of such a combination apparatus is shown in U.S. Pat. No. 4,543,618. Such conventional combination apparatus, however, has a problem in that the start of a program outputted from the playback unit often fails to match the timing of the recording unit in completing its transistion to the stable recording condition. Also, the conventional combination apparatus may fail to stop the dubbing at the end of the prerecorded program. Therefore, in the conventional combination apparatus, some length of the leading portion of the prerecorded section from the playback unit may not be recorded by the recording unit, and it is difficult to place a sufficient space between programs recorded on the tapes of the recording unit. Also, it is difficult to edit efficiently programs on the recording tapes.

SUMMARY OF THE INVENTION

An object of the present invention is to provide a synchronizing circuit for a dubbing apparatus which is able to perform accurate dubbing.

Another object of the present invention is to provide a synchronizing circuit for a dubbing apparatus which is able to perform dubbing in response to a playback program from a playback unit of the dubbing apparatus.

A further object of the present invention is to provide a synchronizing circuit for a dubbing apparatus which is able to match the start of a playback program from a playback unit of the dubbing apparatus with the timing of the activation of the recording section.

A still further object of the present invention is to provide a synchronizing circuit for a dubbing apparatus which is able to stop dubbing in response to the end of the playback program from a playback unit of the dubbing apparatus.

A still further object of the present invention is to provide a synchronizing circuit for a dubbing apparatus which is able to stop a playback unit of the dubbing apparatus in response to completion of the dubbing.

These and other objects are achieved in the synchronizing circuit of the present invention which essentially includes means for checking a recording unit for a stable recording condition in response to the activation of the dubbing command key and for producing a synchronous recording request signal when the stable recording condition is detected, means for driving a playback unit in response to the synchronous recording request signal, means for checking the playback unit for a ready state and for producing a synchronous recording start signal when the ready state is detected, and means for driving the recording unit into a recording mode in response to the synchronous recording start signal produced by the playback unit checking means.

Additional objects, advantages and features of the present invention will further become apparent to persons skilled in the art from a study of following description and of the accompanying drawings.

BRIEF DESCRIPTION OF THE DRAWINGS

FIG. 3 shows diagrams for illustrating the operation of the synchronizing circuit shown in FIG. 1 at an end of a playback program from a playback unit;

FIG. 4 shows a portion of a circuit diagram illustrating a second embodiment of a synchronizing circuit for a dubbing apparatus according to the present invention and a timing chart for illustrating the operation of the synchronizing circuit at the end of a dubbing; and FIG. 5 is a circuit diagram of third embodiment of a synchronizing circuit for a dubbing apparatus according to the present invention.

DESCRIPTION OF THE PREFERRED EMBODIMENTS

Figure 1:
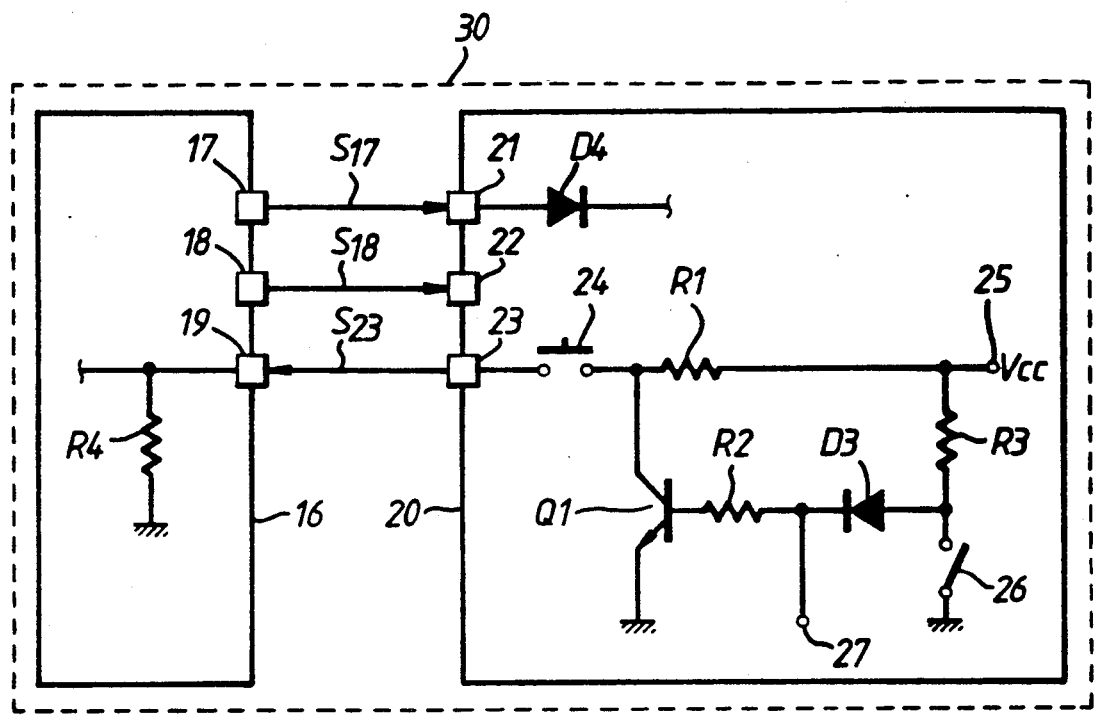
FIG. 1 is a circuit diagram of an embodiment of a synchronizing circuit for a dubbing apparatus according to the present invention.

The present invention will now be described in detail with reference to the accompanying drawings, namely, FIGS. 1 to 5. Throughout the drawings, like reference numerals and letters are used to designate like or equivalent elements for the sake of simplicity of explanation.

An embodiment of the present invention will now be described in detail with reference to FIG. 1. FIG. 1 shows a partial circuit diagram of a CD-cassette player, i.e., a combination apparatus including a CD player unit and a cassette tape recorder unit in a single body. In FIG. 1, reference numeral 16 designates a part of a first control circuit for controlling the CD player unit (not shown). Reference numeral 20 designates a part of a second control circuit for controlling the cassette tape recorder unit (not shown). These first and second control circuits 16 and 20 may be fabricated together in a single microprocessor 30 or separately in individual microprocessors.

First control circuit 16 has a first output port 17 for outputting a synchronous recording start signal S17, a second output port 18 for outputting a synchronous record signal S18 and an input port 19 for receiving a synchronous recording request signal S23 from the cassette tape recorder unit. Second control circuit 20 has a first input port 21 connected to first output port 17 for receiving synchronous recording start signal S17, a second input port 22 connected to first output port 18 for receiving synchronous record signal S18 and an output port 23 for applying the aforementioned synchronous recording request signal S23 to input port 19 of first control circuit 16.

In second control circuit 20, output port 23 is connected to a first switch 24 which is associated with a dubbing command key (DUBBING key) (not shown). The DUBBING key is usually mounted on a front panel of the CD-cassette player. First switch 24 is connected to the collector terminal of a transistor Q1 and a source 25 of a DC voltage Vcc through a resistor R1. In transistor Q1, the emitter terminal is grounded, and the base terminal is connected to DC voltage source 25 through a series circuit of a resistor R2, a forward-biased diode D3 and a resistor R3. A connection node between resistor R3 and diode D3 is grounded through a second switch 26. Another connection node between diode D3 and resistor R2 is connected to a prohibit signal input terminal 27.

Second switch 26 is associated with a detector (not shown) which is mounted in cassette tape recorders for detecting a recording prevention tab of a cassette tape loaded on the cassette tape recorder. As is well known, the recording prevention tab is easy to remove so that recording on a cassette tape may be positively prevented. Therefore, when a cassette tape without the recording prevention tab is loaded in the tape recorder unit, switch 26 is automatically rendered to OFF state. Prohibit signal input terminal 27 is connected to a potential source (not shown) which is associated with a tape drive mechanism in the tape recorder unit. When the tape recorder unit is in any mode other than a record (REC) mode, e.g., a fast forward (FF) mode, a rewind (REW) mode or a playback (PLAY) mode, prohibit signal input terminal 27 receives a high ("H") level potential from the potential source. When the tape recorder unit is in the REC mode, prohibit signal input terminal 27 receives a low ("L") level potential from the potential source. Thus, transistor Q1 is rendered ON by the receipt of an "H" level potential through prohibit signal input terminal 27, when the tape recorder unit is in any state other than the REC mode in spite of the state of second switch 26.

The operation of the above embodiment will be described in detail in reference to timing charts of FIG. 2. First, a cassette tape with the recording prevention tab is loaded in the tape recorder unit, and the tape recorder unit is a state other than the REC mode. When the DUBBING key is operated at a time t1, first switch 24 is turned to ON. Transistor Q1 is turned to OFF as a result of second switch 26 being ON and terminal 27 receiving "L" level potential. At the time t1, therefore output port 23 produces synchronous recording request signal S23 of a "H" level pulse as shown in a graph (a) of FIG. 2. Synchronous recording request signal S23 of "H" level pulse is provided to first control circuit 16 from input port 19 which is grounded through a resistor R4. First control circuit 16 drives the CD player into a playback mode in response to the synchronous recording request signal S23 of "H" level pulse. First control circuit 16 then checks the CD player to determine if the CD player unit is ready to output the playbacked signal. The CD player is ready for outputting the playbacked signal, for example, when a CD is loaded in the correct position in the CD player and reading of the table of contents (TOC) data, i.e., control data for playback prerecorded programs from the CD, is completed.

When first control circuit 16 has completed the check, synchronous recording start signal S17 and synchronous record signal S18 of "H" level as shown in graphs (b) and (c) are outputted from first output port 17 and second output port 18 at a time t2. At time t2, the CD player unit also starts its playback operation. However, the playbacked signal from the CD starts at a time t3 delayed from time t2 by a predetermined time T1 as shown in a graph (d). That is, the CD player unit is delayed from the PLAY mode for delay time T1.

Synchronous recording start signal S17 applied to first input port 21 of second control circuit 20 through a forward biased diode D4. Then, second control circuit 20 controls the tape recorder unit in response to synchronous recording start signal S17, so that the tape recorder unit is transferred to the REC mode. Therefore, the dubbing of the playbacked signal from the CD player unit to a cassette tape loaded on the tape recorder unit starts. Delay time T1 is predetermined, so that the tape drive mechanism of the tape recorder unit establishes stable tape driving after the REC mode is set. Therefore, the playbacked signal from the CD player unit is applied to the tape recorder unit only after the stable tape driving in the REC mode has been established. Synchronous record signal S18 is applied to second input port 22 of second control circuit 20. Second control circuit 20 drives an indicator lamp (not shown) for indicating the REC mode in response to synchronous record signal S18.

Figure 2:
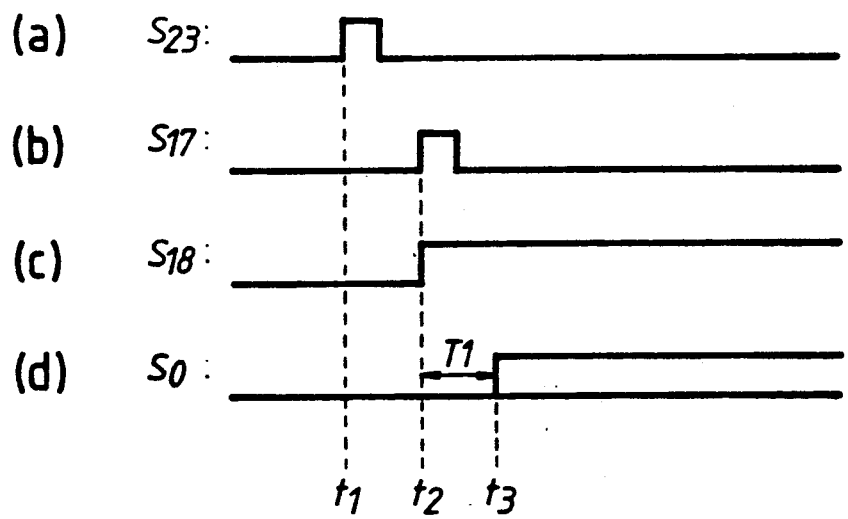
FIG. 2 is a timing chart for illustrating the operation of the synchronizing circuit shown in FIG. 1.

Referring further to FIG. 2, synchronous recording request signal S23 and synchronous recording start signal S17 return to the "L" level after short periods as shown in graphs (a) and (b). However, control circuit 16 and second control circuit 20 are designed to hold the CD player unit and the tape recorder unit in the PLAY mode and the REC mode, respectively, in response to the short period pulses or one-shot pulses of synchronous recording request signal S23 and synchronous recording start signal S17. On the other hand, synchronous record signal S18 maintains its "H" level to maintain the operation of the indicator lamp.

According to the above embodiment, when the DUBBING key has been activated, first control circuit 16 and second control circuit 20 automatically check the CD player unit and the tape recorder unit, respectively. As a result of the checks, the dubbing starts only after the tape recorder unit and the CD player unit have been brought into the stable recording condition and the condition ready to playback, respectively. Therefore, the dubbing is performed easily and accurately. Further, the dubbing is performed without some length of the leading portion of the playbacked signal from the CD player unit failing to be recorded on the cassette tape. This is so because the CD player unit does not produce the played-back signal for the predetermined delay time T1 sufficient to secure the stable recording condition in the tape recorder unit. Furthermore, sufficient spaces are secured between programs recorded on the cassette tape during the dubbing, according to the setting of delay time T1.

Referring now to FIG. 3, the operation of the synchronizing circuit shown in FIG. 1 at the end of programs played back from the CD player unit will be described in detail. Synchronous record signal S18 applied to second input port 22 of second control circuit 20 is restored to "L" level at the end of each program played back from the CD player unit, e.g., at a time t4, as shown in a graph (b) of FIG. 3. At time t4, second control circuit 20 controls the tape recorder unit to automatically stop that unit in response to the transition of synchronous record signal S18 to "L" level, and also controls the indicator lamp for the REC mode. In other words, the tape recorder unit automatically stops when the CD reaches the end of the prerecorded signal.

Referring now to FIG. 4, a modification of the above embodiment shown in FIG. 1 will be described. Drawing (a) shows only the circuit parts which are different from the circuit shown in FIG. 1. As shown in FIG. 4(a), second control circuit 20 has another output port, i.e., second output port 28 for outputting a recorded signal S28 which is generated from the tape recorder unit. First control circuit 16 also has another input port, i.e., a second input port 29 connected for receiving recorded signal S28 from second output port 28 of second control circuit 20. Recorded signal S28 applied to second input port 29 of first control circuit 16 is restored to "L" level when the REC mode of the tape recorder is deactivated or the cassette tape has reached to the tape end at a time t5, as shown in a graph (b) of FIG. 4. At time t5 first control circuit 16 controls the CD player unit to automatically stop that unit in response to the transition of recorded signal S28 to the "L" level. In other words, the CD player unit automatically stops at the end of the recorded signal from the tape recorder unit.

Referring now to FIG. 5, a third embodiment of the synchronizing circuit for the dubbing apparatus according to the present invention will be described. The third embodiment shows a circuit part different from the circuit shown in FIG. 1. In second control circuit 20 of FIG. 5, first switch 24 is connected to the collector terminal of transistor Q3. In transistor Q3, the base terminal is grounded through a series circuit of a resistor and a transistor Q2, and the emitter terminal is connected to source 25 of DC voltage Vcc. The base of transistor Q2 is not only grounded through a resistor, but also connected to DC voltage source 25 through a series circuit of second switch 26 and a resistor.

Therefore, if a cassette tape with a recording prevention tab has been loaded in the tape recorder unit, second switch 26 associated with the detector for detecting the recording prevention tab is transferred to ON. Transistor Q2 also is rendered ON by the bias of DC voltage Vcc from DC source 25. When the DUBBING key is operated in the above condition, transistor Q3 is also turned ON in accordance with the ON state of first switch 24 associated with the DUBBING key. Therefore, second control circuit 20 produces synchronous recording request signal S23 of "H" level pulse, as shown in graph (a) of FIG. 2.

In the above description, CD player units are used as the playback units in the combination apparatus. However, it is easily understood that other playback units like the cassette tape player may be used with slight modification. In addition, it is to be understood that the present invention is not limited to the specific embodiments as described and that various changes in the shape and arrangement of parts may be made without departing from the spirit of the invention.

As described above, the present invention makes it possible to provide a superior synchronizing circuit for a dubbing apparatus.

What is claimed is:

1. A synchronizing circuit for a dubbing apparatus which is capable of dubbing a playback signal played back from a playback unit to a recording unit in response to manual activation of a dubbing command key, comprising:

means for checking the record unit for a stable recording condition in response to the activation of the dubbing command key and for producing a synchronous recording request signal when the stable recording condition is detected, said checking means including switch means, responsive to a predetermined condition of a recording medium mounted in the recording unit, for permitting production of said recording request signal;

means for commencing driving the playback unit in response to the synchronous recording request signal;

means for checking the playback unit for a ready state for commencing the continuous transmission of the playback signal and for producing a synchronous recording start signal when the ready state is detected;

means for driving the recording unit into a continuous recording mode, in response to the synchronous recording start signal produced by the playback unit checking means, to receive and continuously record the playback signal; and wherein the recording unit comprises a cassette tape recorder, the recording medium mounted in the recording unit being a cassette tape cartridge including recording control means for selectively allowing and preventing recording on the cassette tape, and the switch means being responsive to the recording control means.

2. The synchronizing circuit of claim 1, also including delay means for delaying the playback unit from entering a play mode for a predetermined time from the production of the synchronous recording start signal, so that the recording unit only receives the playback signal after the recording unit is in the recording mode.

3. The synchronizing circuit of claim 1, also including means for stopping the driving of the recording unit in the recording mode in response to the termination of the playback signal from the playback unit.

4. The synchronizing circuit of claim 1, also including means for generating and transmitting to the playback unit a recording termination signal in the recording unit upon deactivation of the recording unit for stopping the playback unit.

5. The synchronizing circuit of claim 1, wherein the recording unit checking means also includes means for generating a recording prevention signal when the recording unit is in any state other than the recording mode, and means for preventing activation of the recording unit driving means in response to the recording prevention signal.

6. A synchronizing circuit for a dubbing apparatus which is capable of dubbing a playback signal played back from a playback unit to a recording unit in response to manual activation of a dubbing command key, comprising:

means for checking the record unit for a stable recording condition in response to the activation of the dubbing command key and for producing a synchronous recording request signal when the stable recording condition is detected, said checking means including switch means, responsive to a predetermined condition of a recording medium mounted in the recording unit, for permitting production of said recording request signal;

means for commencing driving the playback unit in response to the synchronous recording request signal;

means for checking the playback unit for a ready state for commencing the continuous transmission of the playback signal and for producing a synchronous recording start signal when the ready state is detected;

means for driving the recording unit into a continuous recording mode, in response to the synchronous recording start signal produced by the playback unit checking means, to receive and continuously record the playback signal; and wherein the playback unit is a compact disc player and the playback unit checking means includes means for detecting the completion of loading of the compact disc into the player and reading of the control data from the disc by the player.

* * * * *